United States Patent [19]
Caskey

[11] Patent Number: 5,192,478
[45] Date of Patent: Mar. 9, 1993

[54] METHOD OF FORMING TUBESHEET FOR HOLLOW FIBERS

[75] Inventor: Terrence L. Caskey, Concord, Calif.

[73] Assignee: The Dow Chemical Company, Midland, Mich.

[21] Appl. No.: 823,007

[22] Filed: Jan. 15, 1992

Related U.S. Application Data

[63] Continuation of Ser. No. 287,508, Dec. 19, 1988, abandoned, which is a continuation of Ser. No. 663,742, Oct. 22, 1984, abandoned.

[51] Int. Cl.$^5$ .................. B32B 31/06; B32B 35/00
[52] U.S. Cl. ..................................... 264/139; 34/9; 156/94; 264/36; 264/232; 264/251; 264/254; 264/255; 264/261; 264/263; 264/311; 264/342 R; 264/344; 264/DIG. 48
[58] Field of Search ............... 264/258, 259, 36, 139, 264/162, 251, 254, 255, 261, 263, 265, 135, 232, 234, 342, 344, 345, DIG. 48; 165/173, 175; 34/9; 210/321.1, 323.1; 156/94

[56] References Cited

U.S. PATENT DOCUMENTS

| | | | |
|---|---|---|---|
| 3,228,877 | 1/1966 | Mahon | 210/638 |
| 3,339,341 | 9/1967 | Maxwell et al. | 55/158 |
| 3,422,008 | 1/1969 | McLain | 210/22 |
| 3,423,491 | 1/1969 | McLain et al. | 210/500.2 |
| 3,455,460 | 7/1969 | Mahon et al. | 210/497.1 |
| 3,499,062 | 2/1970 | Geary, Jr. et al. | 264/36 |
| 3,619,459 | 11/1971 | Schrader | 264/262 |
| 3,722,695 | 3/1973 | Sargent et al. | 210/321 |
| 3,728,256 | 4/1973 | Cooper, IV | 264/258 |
| 3,728,425 | 4/1973 | Schrader | 264/49 |
| 3,755,034 | 8/1973 | Mahon et al. | 210/500.2 |
| 3,842,515 | 10/1974 | MacDonald et al. | 34/9 |
| 4,068,387 | 1/1978 | Manos | 34/9 |
| 4,080,296 | 3/1978 | Clark | 210/321.1 |
| 4,080,743 | 3/1978 | Manos | 34/9 |
| 4,080,744 | 3/1978 | Manos | 34/9 |
| 4,120,098 | 10/1978 | Manos | 264/344 |
| 4,127,625 | 11/1978 | Arisaka et al. | 210/500.2 |
| 4,138,460 | 2/1979 | Tigner | 264/159 |
| 4,170,695 | 10/1979 | Brown et al. | 264/36 |
| 4,183,890 | 1/1980 | Bollinger | 264/139 |
| 4,226,921 | 10/1980 | Tsang | 264/36 |
| 4,248,648 | 2/1981 | Kopp | 264/36 |
| 4,323,454 | 4/1982 | Fritzsche et al. | 210/321.1 |
| 4,369,605 | 1/1983 | Opersteny et al. | 51/319 |
| 4,430,807 | 2/1984 | Davis et al. | 34/9 |

FOREIGN PATENT DOCUMENTS

| | | | |
|---|---|---|---|
| 0788958 | 7/1968 | Canada | 264/36 |
| 0135675 | 10/1979 | Japan | 264/36 |
| 135675 | 10/1979 | Japan . | |
| 138874 | 10/1979 | Japan . | |
| 59004403 | 6/1982 | Japan . | |

OTHER PUBLICATIONS

Lee & Neville "Handbook of Epoxy Resins", pp. 7-22 to 7-25, McGraw-Hill, 1967.

Primary Examiner—Karen Aftergut

[57] ABSTRACT

Hollow fiber membranes can change dimensions upon drying or other processing creating leaks in tubesheets formed on fiber bundles. An adherent layer is formed in contact with an inner surface of each tubesheet and the fiber membranes therein in such a manner as to fill gaps formed between the hollow fiber membranes and each tubesheet during the drying or processing of the hollow fiber membranes and tubesheets. Preferably, the adherent layer is cast from a diglycidyl ether of bisphenol A containing an acrylo-nitrile-modified polyamine curing agent and the hollow fibers are cellulose ester.

18 Claims, 1 Drawing Sheet

METHOD OF FORMING TUBESHEET FOR HOLLOW FIBERS

CROSS-REFERENCE TO RELATED APPLICATION

This is a continuation of application Ser. No. 07/287,508, filed Dec. 19, 1988, now abandoned, which is a continuation of application Ser. No. 06/663,742, filed Oct. 22, 1984, now abandoned.

BACKGROUND OF THE INVENTION

This invention relates to an improved tubesheet composition and method of forming the tubesheet. In one particular embodiment, an improved method of preparing a dry cellulose ester hollow fiber membrane device is disclosed.

A variety of techniques for drying water-wet cellulose ester membranes are known in the prior art. It is essential that the drying be conducted in a manner which does not deleteriously affect the pore structure and consequently the membrane characteristics of the hollow fiber. U.S. Pat. No. 4,430,807 and a number of references cited therein describe the displacement of water from cellulose ester membranes using organic solvents. U.S. Pat. No. 4,127,625 describes the treatment of the membrane with a salt solution followed by freeze drying.

It has been found convenient to assemble water-wet, cellulose ester hollow fiber membranes into a bundle complete with one or more tubesheets and then to dry the bundle. U.S. Pat. Nos. 3,228,876, 3,422,008, 3,455,460 and 3,755,034 are illustrative of some of the methods described in the art for fabrication of hollow fiber membranes devices. Techniques for the formation of tubesheets on hollow fiber membrane devices are also disclosed in U.S. Pat. Nos. 3,339,341, 3,423,491, 3,619,459, 3,722,695, 3,728,425 and 4,138,460. U.S. Pat. No. 4,323,454 suggests at column 4, lines 19–31 that a tubesheet can be cast in successive castings.

Cellulose ester hollow fiber membranes shrink significantly in cross-section upon drying. It has now been discovered that this shrinkage can produce unrelieved tensions, distortions, delaminations and cracks in the tubesheet. A convenient method of repairing the tubesheet is desirable.

SUMMARY OF THE INVENTION

A method of preparing a hollow fiber membrane device is described. In this method first at least one tubesheet is formed on a plurality of hollow fibers. Next the fibers are subjected to a processing step which results in a change in the dimensions or porosity but does not deleteriously affect the membrane characteristics of the hollow fibers. Then, at least one adherent layer is formed in intimate contact with each of the tubesheets and with the fibers embedded in the tubesheet.

A novel membrane device comprising a plurality of hollow fiber membranes, an epoxy resin tubesheet and an adherent layer consisting of an epoxy resin cured with cyanoethylated polyamines is also claimed. Optionally, the membranes in this device can be any conventional hollow fiber membrane, as enumerated in U.S. Pat. No. 3,228,876.

DETAILED DESCRIPTION OF THE INVENTION

Hollow Fiber

Figure 1:
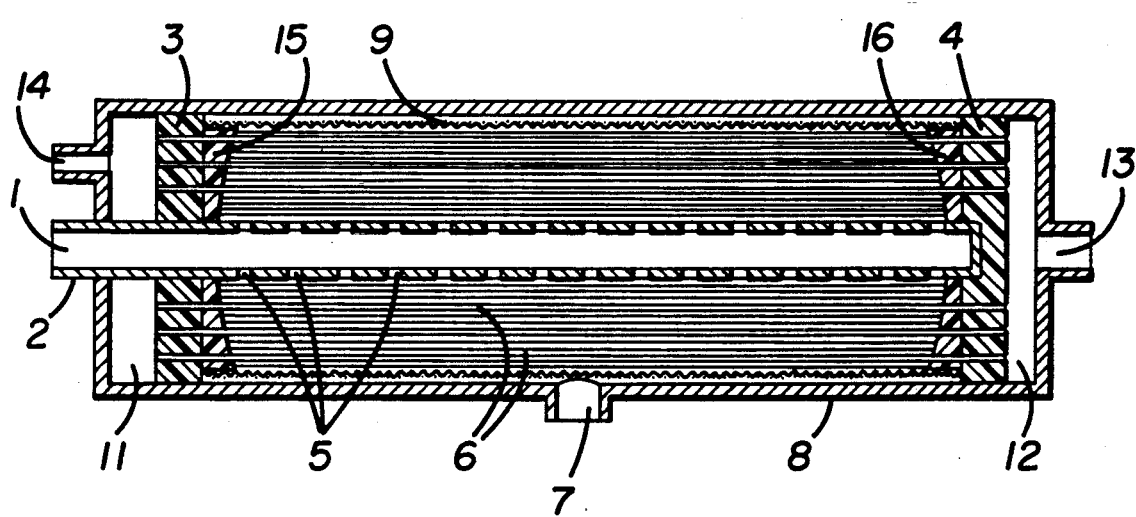
FIG. 1 is a schematic drawing in section of a hollow fiber membrane device illustrative of the subject invention.

The hollow fiber membranes described herein are of the type which undergo a change in dimensions in a post-spinning treatment step. A variety of polymeric hollow fibers known in the prior art undergo such changes in dimensions. In particular, organic fibers which contain a significant percentage of solvents or other components undergo a change in dimensions when these solvents or other components are evaporated or leached from the hollow fiber. In one preferred embodiment of this invention water-containing cellulose esters are employed.

Cellulose ester hollow fiber membranes are well-known in the prior art. As manufactured, these membranes contain up to 70 weight percent water. Dry cellulose ester membranes are useful for separation of gases. Evaporating the water directly from the membrane deleteriously affects membrane characteristics by greatly reducing permeability. Physical integrity of the membrane can be adversely affected by drying. Consequently, a number of techniques have been developed in the prior art to dry cellulose ester membranes without adversely affecting membrane and physical characteristics. Cellulose ester membranes and processes for drying these membranes are described in U.S. Pat. No. 4,430,807, which is incorporated herein by reference.

In a preferred embodiment of the instant process, cellulose acetate hollow fiber membranes, more preferably cellulose diacetate or triacetate, are employed. While these hollow fibers can be homogeneous or asymmetric, asymmetric cellulose triacetate containing from about 40 to about 44 weight percent acetate is preferred.

First Tubesheet

It has been found to be advantageous to assemble the hollow fibers into a bundle and fabricate one or more tubesheets for the bundle prior to drying the entire fibers. Fabrication of the water-wet fibers into a bundle minimizes manipulation of the fibers once dry. Fabrication of tubesheets prior to drying keeps the fibers in a stable configuration during drying and can facilitate drying the fibers in certain embodiments of this invention.

The tubesheet can take a variety of shapes and forms. U.S. Pat. No. 3,228,876 and 3,422,008 describe fibers arranged in a parallel, as a helix or bias-wrap fashion around a core or axis with a tubesheet at each end. The hollow fibers are embedded in and have lumens communicating through both sides of the tubesheet. The hollow fibers can also be looped so that both ends of the fiber extend through a single tubesheet, as in FIG. 1 of U.S. Pat. No. 3,422,008. Alternatively, one end of the fibers can terminate in an endsheet with the opposite ends communicating through a single tubesheet. U.S. Pat. No. 4,080,296 describes a membrane device wherein the fiber lumens communicate through a drilled tubesheet at a point removed from the ends or return loops of the hollow fibers. U.S. Pat. No.

3,455,460 discloses one or two longitudinal tubesheets parallel to the axis of the fiber bundle.

The tubesheets referred to herein can take any of the configurations and be present in the number suggested in the aforementioned prior art references, which are incorporated herein by reference. This invention is also intended to encompass modifications and alternative configurations of the tubesheets, fibers and optionally cores, which would be obvious to one of ordinary skill in the art. Preferably, the hollow fibers are arranged in a bias wrap or parallel fashion about a perforated core with a tubesheet at each end of the bundle.

The tubesheets can be fabricated from any thermoplastic or thermosetting material which bonds to and does not deleteriously affect the hollow fiber membrane. See, e.g., U.S. Pat. No. 4,323,454, which is incorporated herein by reference. Because an adherent layer will later be added to augment the tubesheet, the tubesheet fabricated prior to drying need not meet all the specifications of the tubesheet required when the membrane device is put into operation. All that is necessary is that the tubesheet tolerate the environment to which it is exposed during drying of the fiber. Artificial and natural rubbers, phenolaldehydes, acrylic resins and epoxy resins are illustrative of the types of materials which can be used as tubesheets. Epoxy resins, e.g., the diglycidyl ether of bisphenol A, reacted with amines or other curing agents and optionally reactive diluents, fillers and other modifiers are preferred compositions for the fabrication of tubesheets.

The tubesheet can be formed and cured by any one of a number of techniques known in the prior art. The tubesheet can be formed concurrent with the assembly of the fiber bundle by the application of the tubesheet forming material to the desired area of the fiber. Alternatively, the tubesheet can be cast or molded in the desired region after the fiber bundle is assembled. Centrifugal casting, as described in U.S. Pat. No. 3,339,341, is also operable.

In forming the tubesheet, it is desirable that the viscosity of the material forming the tubesheet be low enough that good penetration between the fibers is attained, but not so low that excessive "wicking" into other regions of the fiber bundle occurs. The preferred viscosity will depend on the size of the hollow fibers, the packing factor for the bundle, the method used to form the tubesheet and other factors. The best viscosity for the tubesheet resin can readily be determined empirically for a given set of conditions.

The tubesheet resin advantageously does not exotherm excessively upon curing. Localized regions of high temperature during curing can deleteriously affect tubesheet strength and/or fiber properties.

It is preferable that the surface of the hollow fiber membranes be dry in the region to be embedded in the tubesheet to promote best adhesion. Surface dryness is conveniently achieved by blowing warm air over the hollow fiber in the region to be potted. Of course, premature drying of the membrane surface to be utilized subsequently in membrane separation processes should be avoided.

Access to the hollow fibers bores in the tubesheet can be achieved by one of several prior art techniques. The tubesheet can be drilled to open the fiber bores as in U.S. Pat. No. 4,080,296. Loops of hollow fiber protruding from one side of the tubesheet can be cut. A portion of the tubesheet itself can be cut. Alternative methods are described in U.S. Pat. Nos. 3,422,008, 4,183,890 and 4,369,605.

Membrane Processing

After assembly into a bundle and formation of one or more tubesheets, the hollow fibers can be processed by any one of the techniques described in the prior art which results in a change in fiber dimensions. For example, the fibers can be subjected to heat to anneal them or soaked in a solvent bath to remove certain components. In a preferred embodiment of the invention, water is removed from cellulose ester hollow fibers. U.S. Pat. Nos. 3,842,515, 4,068,387, 4,080,743, 4,080,744, 4,120,098 and 4,430,807 are illustrative of drying techniques and are incorporated herein by reference. The method disclosed in U.S. Pat. No. 4,430,807 is preferred.

Where it is desirable to maintain different fluids or conditions in the bores than on the external surface of the fibers, the tubesheets can be sealingly engaged with one or more conduits for introduction and removal of fluids from the fiber bores as appropriate. The fiber bundle can be subjected to the desired conditions external to the fibers by immersion in a bath or establishing the desired conditions in a vessel containing the bundle.

In drying or other processing of the hollow fiber membrane, in general, some intermingling of fluids in the fiber bore and those external to the fiber can be tolerated. Consequently, it is not necessary prior to the drying step that the tubesheets be machined and adapted to make a leak-free seal. Moreover, the tubesheet has frequently been observed to change shape as the fibers dry. Accordingly, the effort made to meticulously machine the tubesheet is frequently wasted.

In one preferred embodiment of the invention an inflatable, deformable seal is used about the tubesheet while the hollow fibers are dried in accordance with U.S. Pat. No. 4,430,807. Optionally, a shallow circular groove is machined in the circumference of the tubesheet and an O-ring is inserted in the groove to provide a seal.

Adherent Layer

As noted previously, as the hollow fibers change dimensions leaks develop in the tubesheet. The addition of an adherent layer to the tubesheet present during drying or other processing can plug these leaks and strengthen the tubesheet structure.

In embodiments of the invention in which open fiber ends protrude some distance through the tubesheet, it is operable to cast the adherent layer on this side of the tubesheet so long as the bores of substantially all the fibers remain open. More commonly, the adherent layer will be formed on the side or sides of the tubesheet from which the active membrane surfaces protrude. In the case of tubesheets as in U.S. Pat. No. 4,080,296 wherein active membranes protrude from two sides of the tubesheet, it is desirable to form an adherent layer on both sides of the tubesheet. In any event, all tubesheets present during processing of the fibers are advantageously covered with an adherent layer. Endsheets in which fibers terminate generally do not require an adherent layer unless leaks are observed.

The adherent layers, in general, can be fabricated from the same classes of materials as the tubesheets recited hereinbefore. The tubesheet and adherent layer can be fabricated from the same or different materials. It is usually advantageous that the tubesheet and adherent layer have good adhesion. However, in some embodiments of the invention, the tubesheet present during fiber processing will subsequently be removed leaving the adherent layer to function as a tubesheet. In those embodiments in which the original tubesheet is to be removed, good adhesion between the first tubesheet and adherent layer is not essential.

In embodiments of the invention wherein the tubesheets present during fiber processing are to serve as structural supports engaging directly or indirectly a pressure case of the membrane device, the adherent layer can be comparatively thin. Preferably, the adherent layer is as thin as possible while still providing the desired sealing and integrity to the tubesheet. Where the original tubesheet is to be removed, the adherent layer should have the dimensions generally specified for tubesheets in membrane devices of the type being fabricated.

The adherent layer is conveniently formed by casting. Centrifugal casting can be employed to minimize the reduction in effective membrane area. Alternatively, the tubesheet can be enclosed in a mold and positioned so that the resin used to make the adherent layer will settle and cure on the tubesheet in the desired region. If desired, the mold is sized and shaped to also cast an adherent layer on peripheral surfaces of the tubesheet, which will be machined and adapted to engage a pressure case in the finished device.

Of course, the resin cast to form the adherent layer is advantageously a liquid having a viscosity low enough to permit penetration between the fibers in the bundle but not prone to migrate far from the tubesheet. In one preferred embodiment of the invention, the resin consists by weight of from about 80 to about 100 parts of polyepoxide, such as a diglycidyl ether of a bisphenol, from about 0 to about 20 parts of a reactive diluent and an effective amount of a curing agent. Illustrative polyepoxides, reactive diluents and curing agents are disclosed in U.S. Pat. No. 3,728,425. Diglycidyl ethers of bisphenol A are preferred as polyepoxides. Ethyl hexyl glycidyl ether is preferred as a reactive diluent.

A cyanoethylated polyamine, e.g., ethylene diamine or other aliphatic polyamines modified with acrylonitrile, is particularly preferred as a curing agent. Lee and Neville, Handbook of Epoxy Resins, pp. 7-22 to 7-24 (1967), describes such curing agents. Particularly preferred are the modified polyamines sold by Pacific Anchor Chemical Corporation under the designation ANCAMINE® 1636 and ANCAMINE® 1942. The amount of curing agent required depends on its equivalent weight and other factors and can readily be determined empirically. The curing agent ANCAMINE® 1942, for example, is advantageously present in from about 15 to about 50, preferably about 30 to about 45, parts per hundred resin by weight. As in the tubesheets, additives, fillers and modifiers may be advantageous in some embodiments.

The time required for the adherent layer to solidify will vary dependent on temperature, the resin composition, curing agent, if any, size and other factors. The time needed for the adherent layer to form a solid can readily be determined empirically.

Assembled Membrane Device

Once an adherent layer has been formed on each tubesheet, the tubesheet and adherent layers can be machined as necessary to fit the associated pressure case. In one embodiment of the invention, as noted hereinbefore the original tubesheet can be cut off or otherwise removed leaving what was the adherent layer to serve as a tubesheet. In a preferred embodiment of the invention, the tubesheet and adherent layer are machined to accept an O-ring and sealingly engaged in a pressure vessel.

FIG. 1 illustrates in section an assembled membrane device. The fluid to be separated is introduced into the inlet 1 of the feed pipe 2. The feed pipe 2 passes through a first tubesheet 3 and an adherent layer 15 in contact with the tubesheet 3. The feed pipe also passes through a second adherent layer 16 in contact with a second tubesheet 4, in which the feed pipe 2 terminates. The section of the feed pipe 2 between the two tubesheets 3 and 4 contains a plurality of perforations 5 through which the feed passes to contact the external surfaces of a number of hollow fibers 6 arranged in a generally longitudinal fashion about the perforated feed pipe. Wrapped around the hollow fiber bundle is a porous or woven polymer outer wrap 9, which helps to prevent shifting of fibers in the bundle. Some of the feed passes axially and radially through the hollow fiber bundle to an outlet 7 in the pressure case surrounding the bundle. The remainder of the feed permeates through the walls of hollow fibers. The bores of the hollow fibers communicate at each end through the tubesheet with a head space 11 and 12 on the far side of both tubesheets. The fluid which has permeated through the hollow fibers and collected in the header space can be removed through outlets 13 and 14 in the pressure case which each communicate with one of the header spaces. Optionally, a sweep fluid could be introduced into one header space and removed through the outlet in the other header space to assist in the collection of the permeate.

Where dry asymmetric hollow fibers serve as the membrane, the resulting membrane device is especially well-suited for the separation of a gas mixture. The gaseous feed is preferably introduced external to the hollow fibers, but operably can be introduced into the bores of the fibers. These membrane devices are particularly useful in the separation of carbon dioxide from methane.

The following example is presented to illustrate the invention. All parts and percentages are by weight unless otherwise indicated.

EXAMPLE

A hollow fiber bundle of about 50,000 cellulose triacetate fibers is assembled on a perforated core, fitted with a tubesheet at each end and dried in the manner of Example 1 in U.S. Pat. No. 4,430,807. Each tubesheet was roughly cylindrical with a diameter of about 5 inches and a thickness of about 3.5 inches. The gas separation of the resulting bundle was tested at 20° C. and a feed pressure of 50 pounds per square inch guage. The carbon dioxide permeation flux in units of $cm^3/(second\ cm^2\ cm\ of\ Hg)$ was $7.4 \times 10^{-5}$. The calculated $CO_2/CH_4$ separation factor was 18.6.

The fiber bores in the tubesheets were temporarily sealed with a polymeric foam and the membrane device placed sitting on one tubesheet upright in a mold. The mold was poly(tetrafluoroethylene) coated steel in the shape of an inverted, truncated cone five inches deep. The mold had a diameter at the bottom of 5.5 inches and a diameter of 6.25 inches at the top.

A mixture of 90 parts of the diglycidyl ether of bisphenol A, 10 parts ethyl hexyl glycidyl ether and 40 parts of an acrylonitrile-modified polyamine (AN- CAMINE® 1942) was prepared. The epoxy resin mixture was poured around the tubesheet in the mold covering the tubesheet to a depth of 3 inches. A 5.5-inch diameter, 6-inch high cardboard tube was fitted concentrically around the hollow fiber membrane bundle in contact with the surface of the liquid epoxy in the mold.

When the resin in the mold has cured sufficiently to seal the bottom of the tube, a mixture of the same resin as used in the mold was poured into the tube at 28° C. to a depth of 5 inches. After 2 hours the level of resin in the tube has declined to 3 inches above the resin in the mold. After an additional 4 hours the resin has gelled and curing is completed by heating the resin to 65° C.

The carbon dioxide permeation of the finished unit in the same units as hereinbefore was $4.94 \times 10^{-5}$. The calculated $CO_2/CH_4$ separation factor was 36.6.

What is claimed is:

1. A method of preparing a hollow fiber membrane device comprising sequentially:
   (a) forming at least one tubesheet on a plurality of hollow fiber membranes, each of the hollow fiber membranes having a first end, a second end, and a lumen extending therebetween, the at least one tubesheet being in part defined by a first face proximate to and a second face remote from the first ends of the hollow fiber membranes,
   (b) treating the hollow fiber membranes embedded in the tubesheet whereby the cross-section of the hollow fiber membranes shrink to cause gaps between the hollow fiber membranes and the tubesheet;
   (c) casting a liquid resin on the second face of the tubesheet whereby the resin penetrates between the hollow fiber membranes and into the gaps; and
   (d) curing the resin to form at least one normally solid adherent layer in intimate contact with the second face of the tubesheet and the hollow fiber membranes embedded in the tubesheet, so as to seal the gaps between the hollow fiber membranes and the tubesheet.

2. The method as described in claim 1 wherein the hollow fiber membranes are hollow fibers of cellulose ester, and water is removed from the fibers in the treatment step.

3. The method as described in claim 2 wherein the hollow fibers are disposed in an essentially parallel arrangement about a perforated core.

4. The method as described in claim 3 wherein the hollow fibers are embedded in two tubesheets, one at each end of the fibers.

5. The method as described in claim 2 wherein the hollow fibers are disposed as a plurality of helices about a perforated core.

6. The method as described in claim 5 wherein the hollow fibers are present as helices in opposing directions and a plurality of hollow fibers contact each other at oblique angles.

7. The method as described in claim 5 wherein the hollow fibers are embedded in two tubesheets, one at each end of the fibers.

8. The method as described in claim 6 wherein the hollow fibers are embedded in two tubesheets, one at each end of the fibers.

9. The method as described in claim 2 wherein an intermediate tubesheet is disposed on some intermediate region of the hollow fibers, such that the hollow fibers protrudes from at least two opposed faces of the intermediate tubesheet.

10. The method as described in claim 2 wherein the tubesheet is formed from an epoxy resin.

11. The method as described in claim 2 further comprising drying the surface of the hollow fibers in the region where the tubesheet is formed prior to forming the tubesheet.

12. The method as described in claim 2 wherein the hollow fibers are cellulose acetate.

13. The method as described in claim 2 wherein the hollow fibers are asymmetric cellulose triacetate consisting of from about 40 to about 44 weight percent acetate.

14. The method as described in claim 9 wherein an adherent layer is disposed on each face of the intermediate tubesheet from which hollow fibers protrude.

15. The method as described in claim 2 wherein the adherent layer comprises about 80 to about 100 parts by weight of epoxy resin, about 0 to about 20 parts by weight reactive diluent and an effective amount of a curing agent.

16. The method as described in claim 15 wherein the epoxy resin is a diglycidyl ether of bisphenol A.

17. The method as described in claim 16 wherein the curing agent is a cyanoethylated polyamine present in from about 15 to about 50 parts per hundred parts resin by weight.

18. The method as described in claim 1 further comprising machining the at least one tubesheet and adherent layer to remove the original tubesheet and expose fiber bores communicating through the adherent layer.

* * * * *